United States Patent [19]

McGarrity et al.

[11] Patent Number: 4,669,503

[45] Date of Patent: Jun. 2, 1987

[54] THREE-WAY VALVE

[75] Inventors: George V. McGarrity; David C. Foster, both of Mishawaka; Duane Hurford, Tyner, all of Ind.

[73] Assignee: Bristol Corporation, South Bend, Ind.

[21] Appl. No.: 853,907

[22] Filed: Apr. 21, 1986

[51] Int. Cl.⁴ .......................................... F16K 11/085
[52] U.S. Cl. ........................... 137/625.41; 137/625.47
[58] Field of Search ................ 137/625.24, 625.41, 137/625.47

[56] References Cited

U.S. PATENT DOCUMENTS 1,204,368 11/1916 Lowy .................. 137/625.41 X
1,458,203  6/1923 Tanner ................ 137/625.41 X
3,809,519  5/1974 Garner ................ 137/625.41 X
4,173,234 11/1979 Thomas ................ 137/625.47

FOREIGN PATENT DOCUMENTS 561169 10/1957 Belgium ................ 137/625.24
246687  2/1926 United Kingdom ......... 137/625.24

Primary Examiner—Robert G. Nilson
Attorney, Agent, or Firm—James D. Hall

[57] ABSTRACT

A waste water valve which includes a valve housing having two inlets and an outlet. A valve plug which includes two spaced passageways is rotatably positioned within the valve housing and selectively provides a path for waste water flow through one of the inlets to the other with the other inlet being sealed during such flow.

2 Claims, 13 Drawing Figures

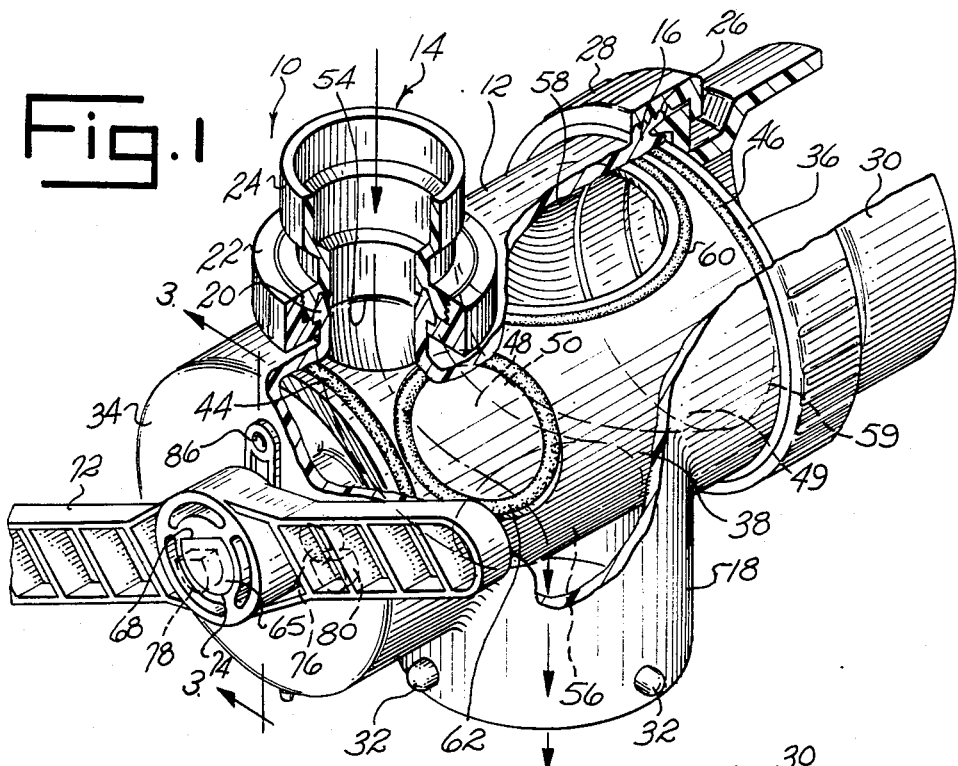
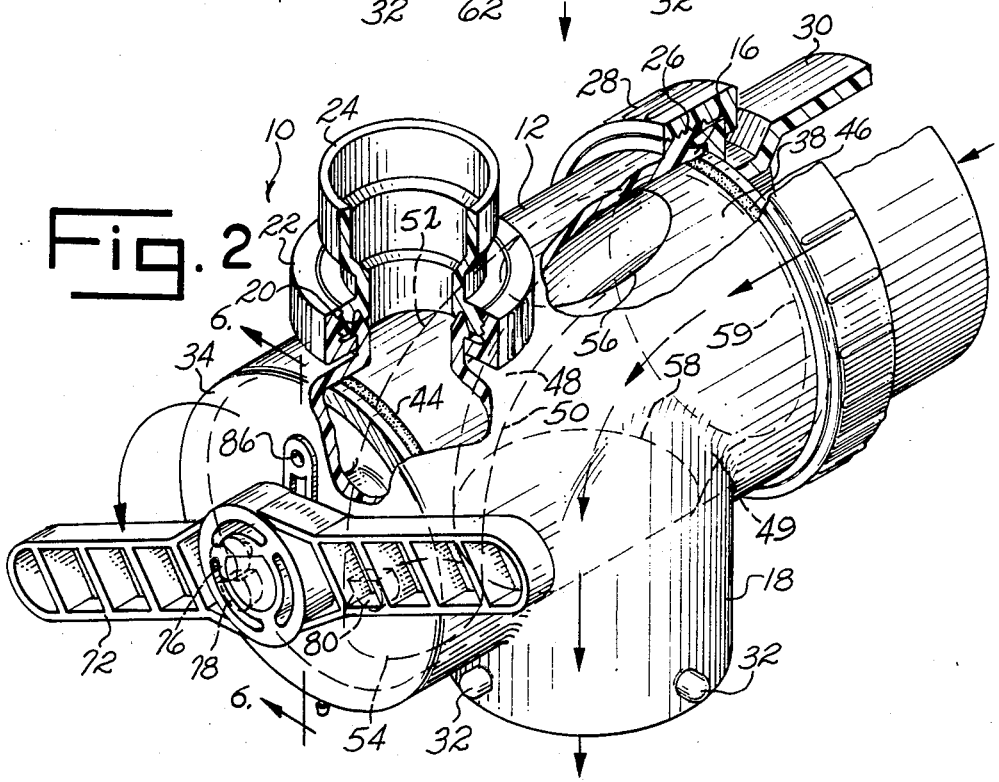

THREE-WAY VALVE

SUMMARY OF THE INVENTION

This invention relates to a valve and will have application to a waste water valve used in recreational vehicles.

Efficient and safe disposal of waste water has long presented a problem to owners of recreational vehicles. Due to the differences in waste water composition from various sources, it is desirable to prevent intermingling of waste water and reduce the probability of backflow of waste water from one source to another, most particularly backflow from the toilets into the kitchen or other water lines. Previous waste water valves included separate inlet pipes which converged into a single discharge outlet. Each inlet included a separate gated shut-off valve through which waste water flowed into the outlet was individually controlled. Such a valve has been manufactured by Anonda Plastics, Inc. Pacoima, California. Unfortunately, such individual gated valve devices were susceptible to stone damage due to the exposed exterior location of the devices on the recreational vehicles. Also such valve devices have had difficulty in providing a consistent efficient seal.

The waste water valve of this invention is capable of servicing a conventional two inlet-one outlet waste water discharge system. The valve is of the plug type and includes a plug part which has two passageways and is rotatable within the valve housing between three positions, namely, a closed position in which both inlets are closed, and two open positions in which a selected inlet is open with the other inlet being closed and sealed against intermingling of fluid from the open inlet. Curved fluid flow surfaces provide for smooth flow through the valve with minimal pressure drops.

Accordingly, it is an object of this invention to provide an improved three-way fluid valve.

Another object of this invention is to provide for a recreational vehicle waste water valve which prevents intermingling of waste water.

Another object of this invention is to provide for a recreational vehicle waste water valve which effectively seals one inlet during water discharge through the other inlet.

Another object of this invention is to provide for a recreational vehicle waste water valve which is efficient and economical.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a fragmentary perspective view of the valve in a first open position with portions of the housing broken away for purposes of illustration.

FIG. 2 is a fragmentary perspective view similar to FIG. 1, but showing the valve in a second open position.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to thereby enable others skilled in the art to utilize the invention.

Figure 13:
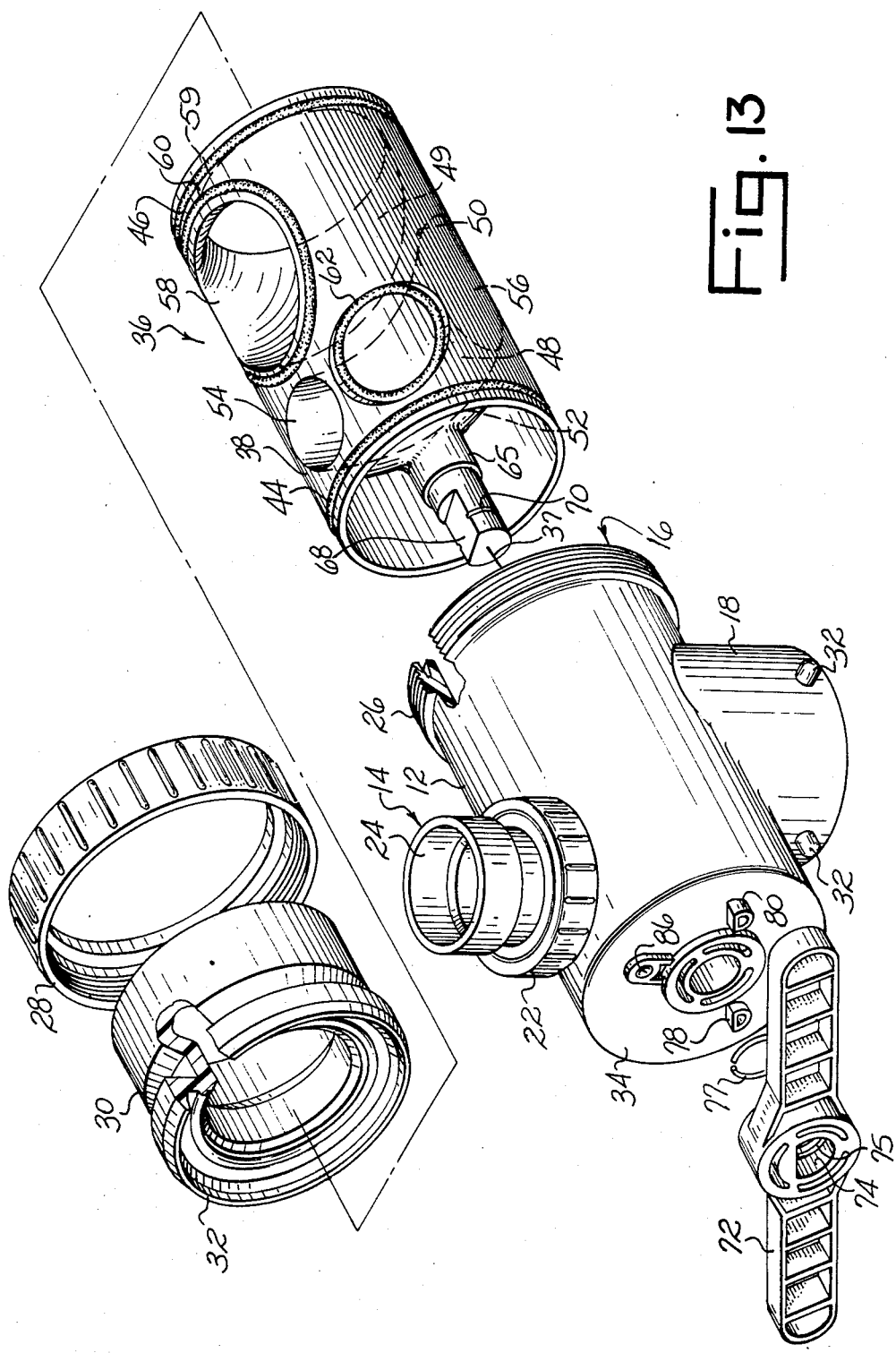
FIG. 13 is a view of the valve showing its commponents in exploded form.

Valve 10, shown in the drawings, includes a cylindrical valve housing 12 which has two waste water inlet ports 14 and 16 and a waste water outlet port 18. Inlet 14 includes an outturned securement lip 20 which, along with lock ring 22, secures an adapter 24 as shown in FIGS. 1 and 2. Adapter 24 is preferably connected to the main waste water line (not shown) from the showers and sinks of a recreational vehicle (not shown), commonly called the "gray water" line. Inlet 16 includes a threaded outturned lip 26 which, along with lock ring 28, secures adapter 30 as shown in FIGS. 1 and 2. Adapter 30 is preferably connected to the waste water line (not shown) from the toilet bowl of the recreational vehicle (not shown) commonly referred to as the "black water" line. Outlet port 18 includes a plurality of lock tabs 32 which secure a flexible detachable hose (not shown) when waste water is disposed of through valves. As best seen in FIG. 13, housing 12 opposite outlet 18 is closed by an end wall 34 which includes a bore 35.

Figure 11:
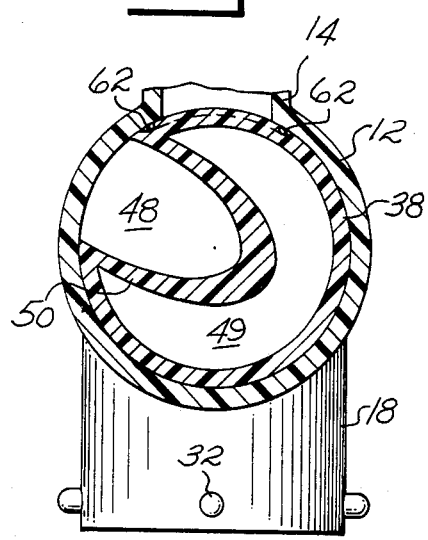
FIG. 11 is a fragmentary cross-sectional view of the valve similar to FIGS. 4 and 7, but showing the valve in a closed position.

A valve plug 36 is restrictively but rotatably positioned in valve housing 12 as shown in FIGS. 1-8. Plug 36 includes a cylindrical body 38 open having peripheral seals, such as O-rings 44,46 at its end thereof. A passageway 48 is formed in body 38 by wall 50 which terminates in openings 54 and 56. A seal, such as O-ring 60 circumscribes plug opening 58 and a seal, such as O-ring 62, is secured to valve plug 36 and circumscribes plug opening 54 to prevent leakage when the stem is in the closed position (FIG. 11). A passageway 49 is formed in plug body 38 by a wall 52 which terminates in openings 58 and 59. Passageways 48 and 49 are generally parallel each other. A stem 65 extends integrally from plug 36 at passageway wall 50 and includes an intermediate shoulder 69 which abuts the inside of housing end wall 34. Stem 65 protrudes outwardly from end wall 34 through wall bore 35 and includes a flat 68 and an exterior groove 70.

Figure 9:
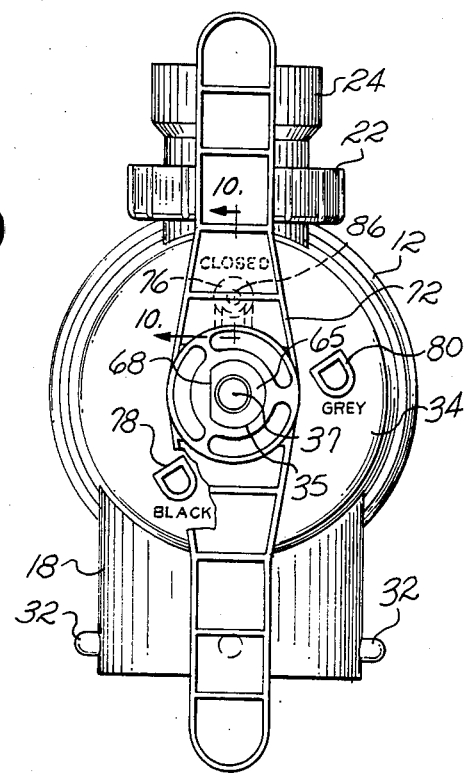
FIG. 9 is an elevational view of the valve which illustrates the valve and control handle in a closed position.
Figure 10:
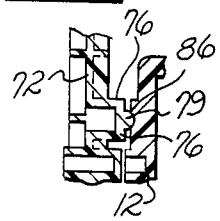
FIG. 10 is a fragmentary sectional view taken along line 10—10 of FIG. 9.

A handle 72 includes a center bore 74 which complementally accepts stem 65. Handle bore 74 includes an internal channel 75 which accepts a retainer ring 77 seated in stem groove 70 to secure the handle to the stem. Handle 72 (shown in detail in FIGS. 9-10) includes a nib 76. Housing end wall 34 includes spaced nipples 78,80 which stop rotation of handle 72 at nib 76 as seen in FIGS. 1 and 2. A recess 86 in housing end wall 34 between nipples 78,80 accepts a bead 79 which protrudes from nib 76 to lock the valve in its closed position, as seen in FIGS. 9 and 10.

Figure 3:
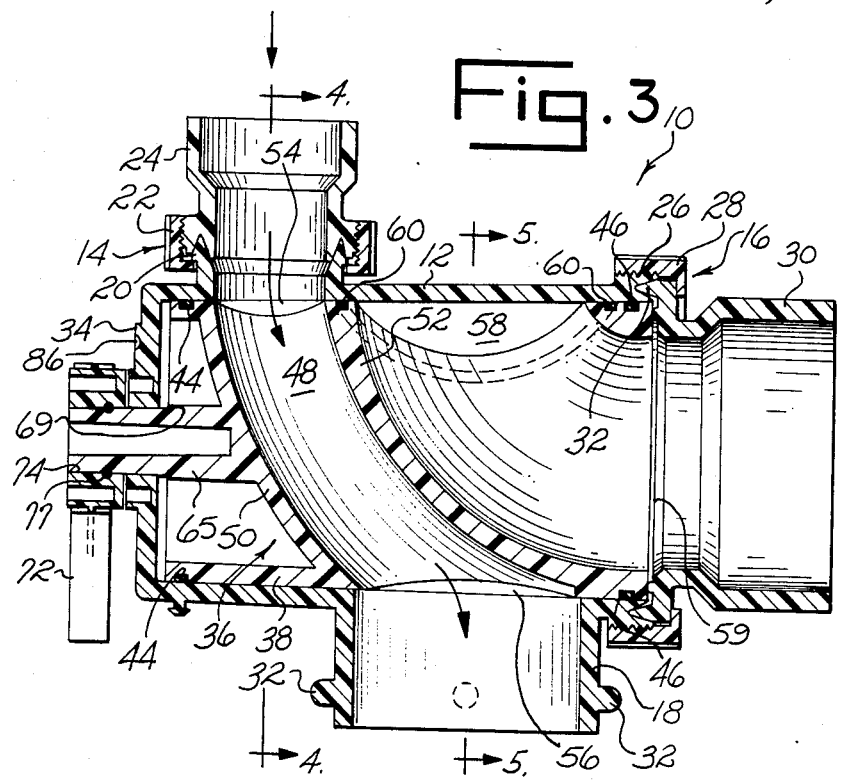
FIG. 3 is a sectional view taken along line 3—3 of FIG. 1.
Figure 4:
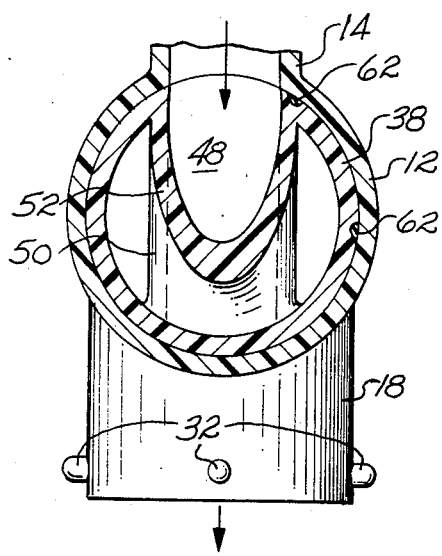
FIG. 4 is a fragmentary cross-sectional view taken along line 4—4 of FIG. 3.
Figure 5:
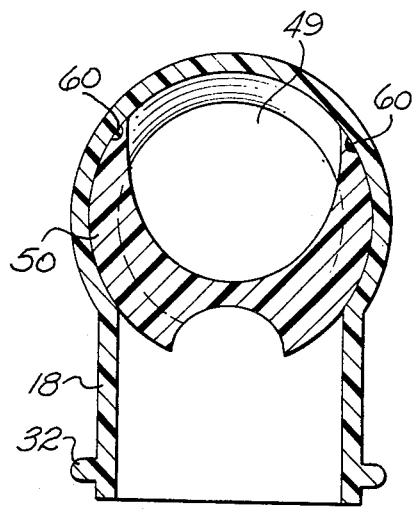
FIG. 5 is a fragmentary cross-sectional view taken along line 5—5 of FIG. 3.
Figure 6:
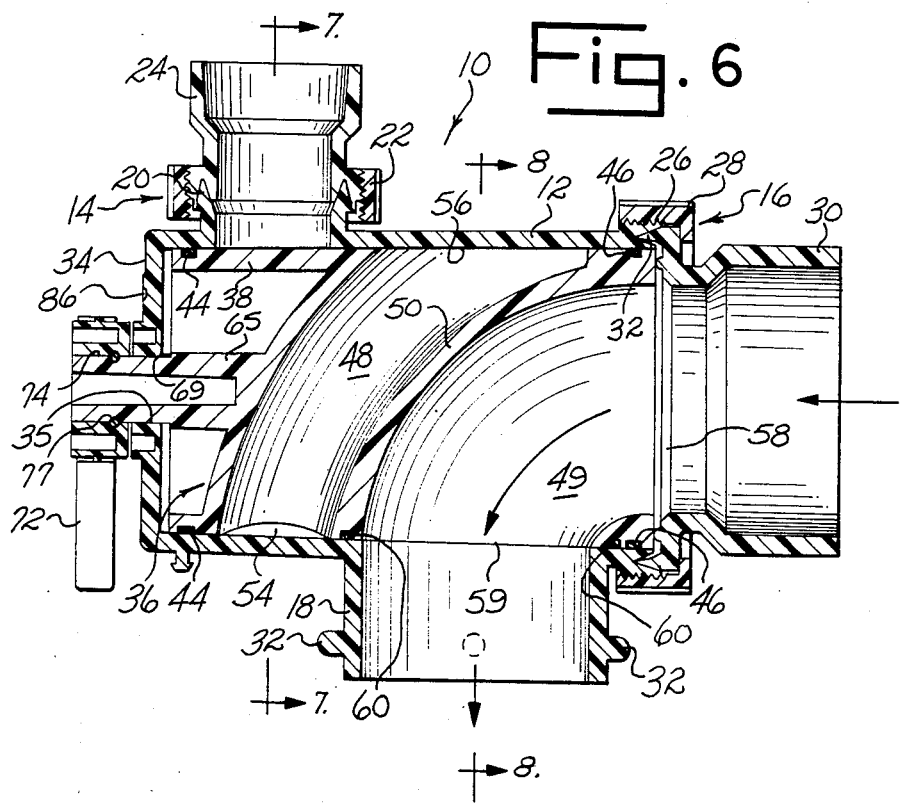
FIG. 6 is a sectional view taken along line 6—6 of FIG. 2.
Figure 7:
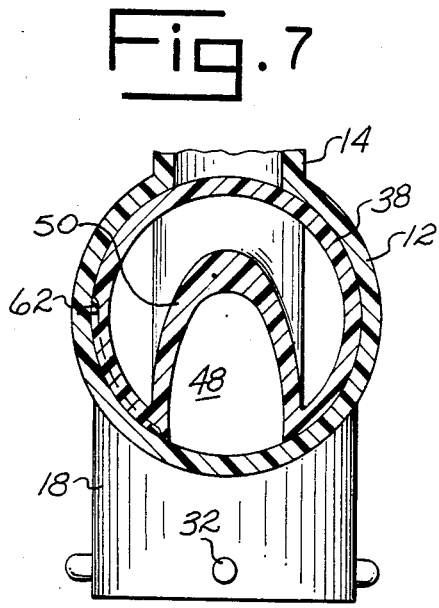
FIG. 7 is a fragmentary cross-sectional view taken along line 7—7 of FIG. 6.
Figure 8:
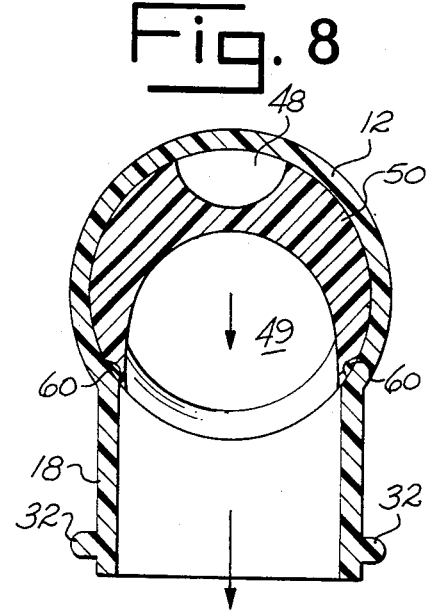
FIG. 8 is a fragmentary cross-sectional view taken along line 8—8 of FIG. 6.
Figure 12:
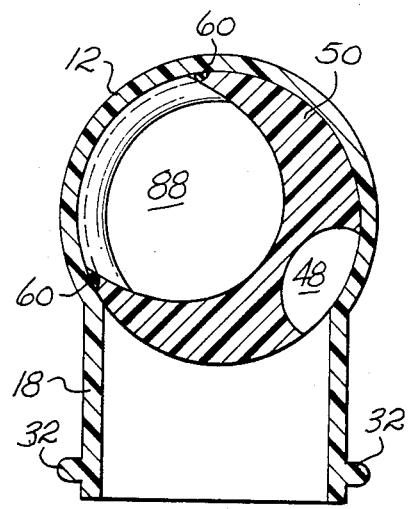
FIG. 12 is a fragmentary cross-sectional view of the valve similar to FIGS. 5 and 6, but showing the valve in a closed position.

Valve 10 operates as follows. With inlets 14,16 connected to their respective water sources, stem 36 is pivoted about its axis 37 by handle 72 from its closed position (FIGS. 9, 11 and 12) clockwise until nib 76 abuts nipple 80 as shown in FIG. 1. In this position, passageway 48 has its openings 54 and 56 communicating with "gray water" inlet 14 and outlet 18. As seen in FIG. 3, "black water" is prevented from intermingling with the "gray water" by seals 46 and 60. When all "gray water" has been disposed, handle 72 is pivoted counter-clockwise until bead 79 is seated in recess 86 in the housing end wall.

To drain the "black water," handle 72 is pivoted from its closed position counter clockwise (See FIG. 2) until nib 76 abuts nipple 78.

In this position, passageway 49 has its openings 58,59 communicating with "black water" inlet 16 and outlet 18. Seals 46 and 60 again prevent intermingling of "gray" and "black water." After all "black water" has been drained, handle 10 is returned to its closed position (FIG. 9) with bead 79 seated in housing recess 86. In this position, neither passageway 48 or 49 communicates with outlet 18.

The curved relationship of passageways 48,49 reduce the friction of fluid flow through the valve and thus reduce the pressure drop across the valve. Valve 10 may be formed from metal or plastic.

The above description does not intend to limit the invention to the given details but may be modified within the scope of the appended claims.

We claim:

1. A valve assembly comprising a housing including first and second inlets, and an outlet in liquid flow communication with each inlet; a plug rotatively positioned within said housing; said plug including first and second passageways through the plug; means for rotating the plug relative to said housing between a first open position wherein said first passageway is aligned with one of said first and second inlets and said outlet with the other of said first and second inlets being sealed by the plug, a second open position wherein said second passageway is aligned with said other first and second inlets and said outlet with said one of the first and second inlets being sealed by said plug, and a closed position wherein said plug seals both said first and second inlets from said outlet; said plug rotatable about an axis; said first inlet located along said axis; said second inlet located laterally of said axis; said outlet located laterally of said axis and being offset longitudinally of said axis from said second inlet; said plug first passageway extending transversely of said axis and having one end alignable with said second inlet and its opposite end alignable with said outlet; said plug second passageway extending from said axis to a lateral location from the axis and having one end alignable with said first inlet and its opposite end alignable with said outlet.

2. The valve assembly of claim 1 wherein said plug first and second passages are arcuate and generally parallel.

* * * * *